(12) United States Patent
Amador et al.

(10) Patent No.: US 11,306,657 B2
(45) Date of Patent: Apr. 19, 2022

(54) GAS TURBINE ENGINE INCLUDING SQUEEZE FILM DAMPER WITH RESERVOIR

(71) Applicant: United Technologies Corporation, Farmington, CT (US)

(72) Inventors: Armando Amador, Wethersfield, CT (US); Ernest Boratgis, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 44 days.

(21) Appl. No.: 16/736,281

(22) Filed: Jan. 7, 2020

(65) Prior Publication Data
US 2021/0207532 A1 Jul. 8, 2021

(51) Int. Cl.
*F02C 7/06* (2006.01)
*F01D 9/06* (2006.01)
(Continued)

(52) U.S. Cl.
CPC .............. *F02C 7/06* (2013.01); *F01D 9/065* (2013.01); *F01D 25/164* (2013.01); *F01D 25/18* (2013.01); *F01D 25/20* (2013.01); *F01D 25/22* (2013.01); *F16C 27/045* (2013.01); *F05D 2220/323* (2013.01); *F05D 2220/40* (2013.01); *F05D 2240/50* (2013.01); *F05D 2240/55* (2013.01); *F05D 2240/60* (2013.01); *F05D 2260/40311* (2013.01); *F05D 2260/96* (2013.01); *F05D 2260/98* (2013.01); *F16C 2360/23* (2013.01); *F16F 15/0237* (2013.01)

(58) Field of Classification Search
CPC ...... F02C 7/06; F16C 27/045; F16C 2360/23; F01D 25/164; F01D 9/065; F01D 25/18; F01D 25/20; F01D 25/22; F16F 15/0237; F05D 2240/50; F05D 2220/40; F05D 2260/96; F05D 2260/98; F05D 2240/60; F05D 2240/55; F05D 2260/40311; F05D 2220/323
USPC ......................................................... 415/229
See application file for complete search history.

(56) References Cited

U.S. PATENT DOCUMENTS 4,669,893 A * 6/1987 Chalaire ............... F16C 27/045
384/99
4,782,919 A * 11/1988 Chalaire ............. F16F 15/0237
184/6.11
(Continued)

FOREIGN PATENT DOCUMENTS

FR 3069571 A1 2/2019

OTHER PUBLICATIONS

European Search Report for European Patent Application No. EP 21 15 0215.8, completed May 17, 2021.

*Primary Examiner* — Yi-Kai Wang
(74) *Attorney, Agent, or Firm* — Carlson, Gaskey & Olds, P.C.

(57) ABSTRACT

A gas turbine engine according to an exemplary aspect of the present disclosure includes, among other things, a shaft configured to rotate during operation of the gas turbine engine, and a squeeze film damper radially outside the shaft. The squeeze film damper includes a cavity including a film of lubricant axially between first and second cavity seals, and further includes a reservoir fluidly coupled to the cavity. A method is also disclosed.

19 Claims, 8 Drawing Sheets

(51) Int. Cl.
  *F01D 25/16* (2006.01)
  *F01D 25/18* (2006.01)
  *F01D 25/20* (2006.01)
  *F01D 25/22* (2006.01)
  *F16C 27/04* (2006.01)
  *F16F 15/023* (2006.01)

(56) References Cited

U.S. PATENT DOCUMENTS

| | | | |
|---|---|---|---|
| 5,067,825 A * | 11/1991 | Vance | F16C 27/045 |
| | | | 384/99 |
| 5,071,262 A | 12/1991 | Monzel et al. | |
| 5,149,206 A | 9/1992 | Bobo | |
| 5,197,807 A | 3/1993 | Kuznar | |
| 5,207,511 A | 5/1993 | Bobo | |
| 5,344,239 A * | 9/1994 | Stallone | F01D 25/164 |
| | | | 384/99 |
| 7,665,897 B2 | 2/2010 | Alam et al. | |
| 10,094,420 B1 | 10/2018 | Hudson et al. | |
| 10,233,778 B2 | 3/2019 | Gysling et al. | |
| 2018/0274588 A1* | 9/2018 | Hudson | F01D 25/166 |
| 2019/0360524 A1* | 11/2019 | Ellwood, III | F16C 33/583 |

* cited by examiner

GAS TURBINE ENGINE INCLUDING SQUEEZE FILM DAMPER WITH RESERVOIR

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

SUMMARY

A gas turbine engine according to an exemplary aspect of the present disclosure includes, among other things, a shaft configured to rotate during operation of the gas turbine engine, and a squeeze film damper radially outside the shaft. The squeeze film damper includes a cavity including a film of lubricant axially between first and second cavity seals, and further includes a reservoir fluidly coupled to the cavity.

In a further non-limiting embodiment of the foregoing gas turbine engine, the reservoir is passively fluidly coupled to the cavity such that lubricant flows between the reservoir and cavity during operation of the gas turbine engine.

In a further non-limiting embodiment of any of the foregoing gas turbine engines, the gas turbine engine includes an opening fluidly coupling the cavity to the reservoir, and the opening extends radially outward from a bottom-most location of the cavity.

In a further non-limiting embodiment of any of the foregoing gas turbine engines, at least one of the first and second cavity seals includes an opening fluidly coupling the cavity to the reservoir.

In a further non-limiting embodiment of any of the foregoing gas turbine engines, the opening is adjacent a bottom-most location of the cavity.

In a further non-limiting embodiment of any of the foregoing gas turbine engines, the reservoir is axially spaced-apart from the cavity.

In a further non-limiting embodiment of any of the foregoing gas turbine engines, the first and second cavity seals each include an opening fluidly coupling the cavity to the reservoir.

In a further non-limiting embodiment of any of the foregoing gas turbine engines, the reservoir includes a first portion on a first axial side of the cavity and a second portion on a second axial side of the cavity opposite the first axial side.

In a further non-limiting embodiment of any of the foregoing gas turbine engines, the first portion is bound at least in part by the first cavity seal and either a first reservoir seal, a ring, or a projection, and the second portion is bound at least in part by the second cavity seal and either a second reservoir seal or a projection.

In a further non-limiting embodiment of any of the foregoing gas turbine engines, the gas turbine engine includes a housing, and a bearing radially inside the housing and radially outside the shaft. The bearing includes an inner race mounted to the shaft, an outer race, and a plurality of rolling elements between the inner and outer races.

In a further non-limiting embodiment of any of the foregoing gas turbine engines, the housing provides a radially outer boundary of the cavity and the outer race provides a radially inner boundary of the cavity.

In a further non-limiting embodiment of any of the foregoing gas turbine engines, the gas turbine engine includes a source of lubricant fluidly coupled to the cavity.

In a further non-limiting embodiment of any of the foregoing gas turbine engines, the lubricant is oil or an air-oil mixture.

In a further non-limiting embodiment of any of the foregoing gas turbine engines, a port is fluidly coupled to a top-most location of the reservoir.

In a further non-limiting embodiment of any of the foregoing gas turbine engines, the port includes an oil pool.

In a further non-limiting embodiment of any of the foregoing gas turbine engines, the shaft is one of a low speed spool and a high speed spool.

In a further non-limiting embodiment of any of the foregoing gas turbine engines, the squeeze film damper is one of a plurality of squeeze film dampers arranged along the shaft.

A method according to an exemplary aspect of the present disclosure includes, among other things, permitting lubricant to passively flow between a cavity of a squeeze film damper and a reservoir during operation of a gas turbine engine.

In a further non-limiting embodiment of the foregoing method, the cavity is radially between a rotating assembly and a static housing, and the rotating assembly rotates about an axis spaced-apart from a central longitudinal axis of the gas turbine engine during operation of the gas turbine engine.

In a further non-limiting embodiment of any of the foregoing methods, the rotating assembly creates a leading high pressure wave which causes lubricant to flow from the cavity into the reservoir, and a trailing low pressure wake which causes lubricant to flow from the reservoir into the cavity.

BRIEF DESCRIPTION OF THE DRAWINGS

In FIG. 3, a rotating assembly of the squeeze film damper is in a different position than in FIG. 2.

DETAILED DESCRIPTION

Figure 1:
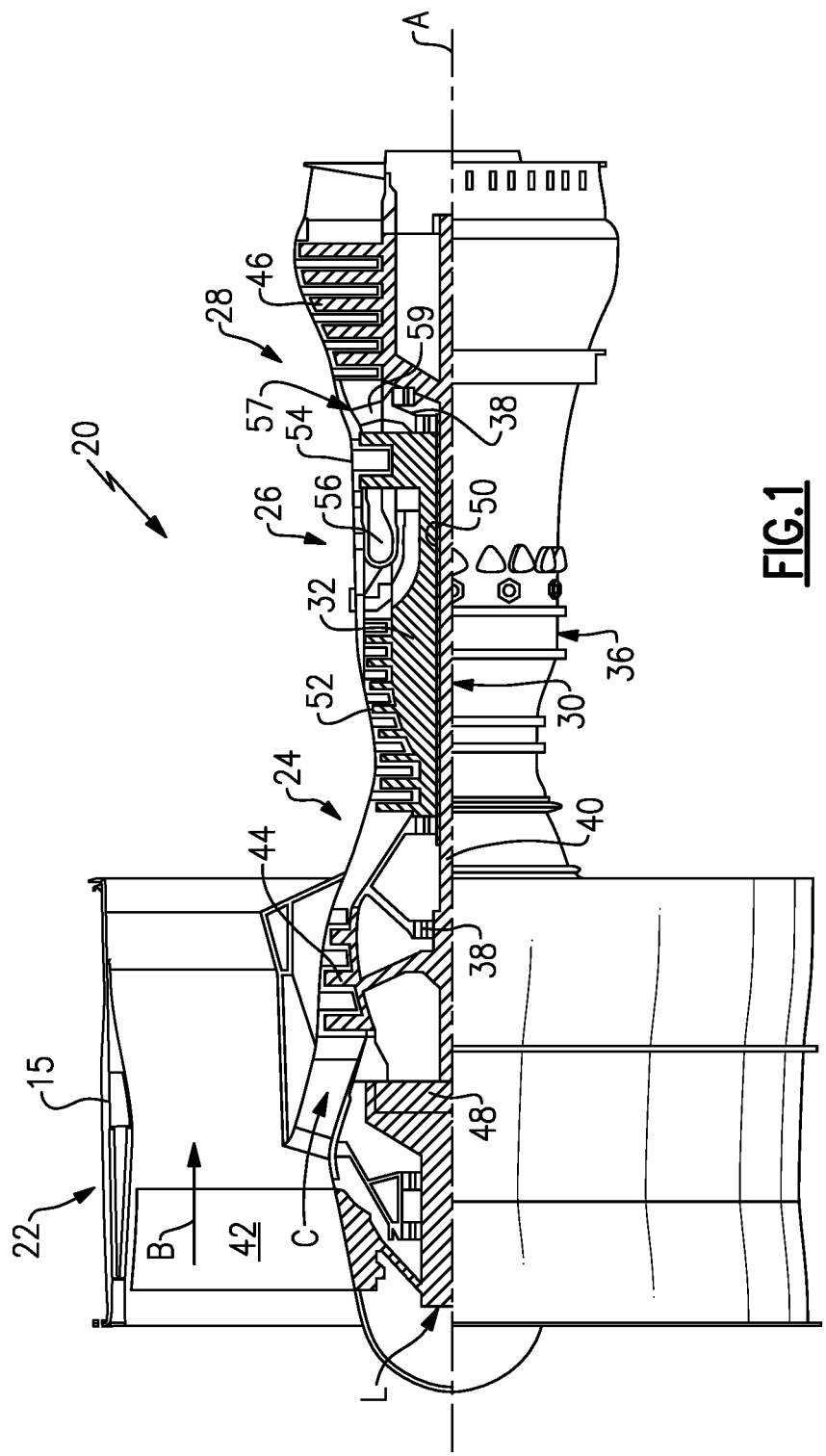
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
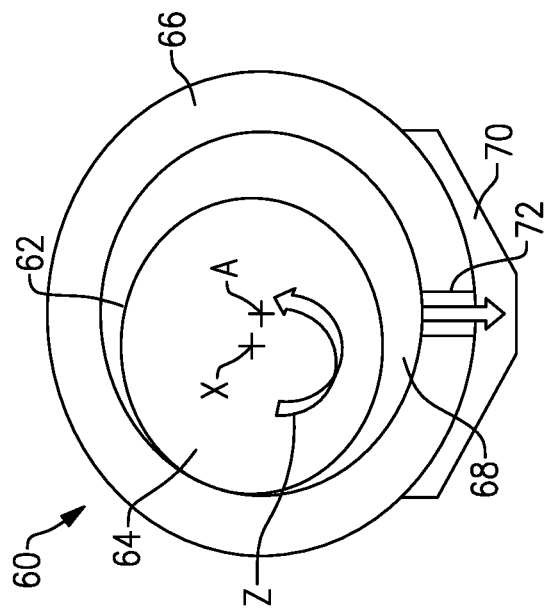
FIG. 2 is a schematic cross-sectional view of a portion of the engine including an example squeeze film damper.

FIG. 2 is a schematic cross-sectional view of a portion of the engine 20 including a squeeze film damper 60. The squeeze film damper 60 is configured to reduce vibrations and other instabilities in rotating shafts, such as the low speed spool 30 and/or the high speed spool 32, within the engine 20. Each shaft of the engine 20 may include one or more of the squeeze film dampers 60. The squeeze film dampers 60 may be spaced-apart from one another along the length of the respective shaft. The squeeze film dampers 60 may be arranged adjacent bearings rotationally supporting the shafts in the engine 20. The squeeze film dampers 60 may be located in or adjacent bearing compartments. This disclosure is not limited to any particular location of the squeeze film dampers, however.

In the example of FIG. 2, the squeeze film damper 60 includes a cavity 62 radially (i.e., in a direction normal to the engine central longitudinal axis A) between a rotating assembly 64 and a static housing 66. The cavity 62 includes a relatively thin film of lubricant, which in one example is oil. In another example, the lubricant is an air-oil mixture. The cavity 62 is fluidly coupled to a source of lubricant. In particular, the cavity 62 may be fluidly coupled with a bearing compartment or arranged in a bearing compartment, and receive a supply of lubricant from the bearing compartment.

During operation of the engine 20, the rotating assembly 64, which may include the low speed spool 30 and/or the high speed spool 32 along with a bearing, rotates about its central axis X, which ideally is concentric with the engine central longitudinal axis A. Not all elements in the rotating assembly 64 are rotatable in all examples. However, during operating of the engine 20, the axis X may become slightly spaced-apart from the engine central longitudinal axis A at the location of the squeeze film damper 60. In such cases the axis X of the rotating assembly 64 orbits about the engine central longitudinal axis A. The path of orbit may be circular or non-circular.

During operation of the engine 20, the rotating assembly 64 rotates in the direction Z about the axis X. In this example, the Z direction is a counter-clockwise direction. In FIG. 2, the axis X is spaced-apart from the engine central longitudinal axis A in the left-hand direction. As the rotating assembly 64 rotates in the direction Z it also orbits the engine central longitudinal axis A in the same direction. Further, the rotating assembly 64 creates a leading high pressure wave of lubricant at location 68. The rotating assembly 64 causes lubricant to flow from the cavity 62 into a reservoir 70 via an opening, which here is a single orifice 72, in the static housing 66. The reservoir 70 is an enclosed space which is fluidly coupled to the cavity 62, and is configured to hold lubricant therein. In this example, the reservoir 70 is radially outside the cavity 62 and the housing 66, and the orifice 72 extends radially outward from a bottom-most location of the cavity 62, sometimes referred to as bottom dead center (BDC). This disclosure extends to other arrangements of the opening(s) and reservoir, however.

In this example, the reservoir 70 is passively fluidly coupled to the cavity 62, meaning lubricant is free to flow in and out of the reservoir 70. For instance, as the rotating assembly 64 approaches the orifice 72, the leading high pressure wave forces lubricant into the reservoir 70. The rotating assembly 64 also creates a trailing low pressure wake of lubricant, at location 73 in FIG. 3, for example. As the rotating assembly 64 rotates past the orifice 72 the trailing low pressure wake causes lubricant to flow from the reservoir 70 into the cavity 62. Thus, in this disclosure, the low pressure wake causes the cavity 62 to ingest (i.e., draw in) the same lubricant already in the cavity, rather than ingesting air, for example, which could lead to an undesirable amount of air in the lubricant, which in turn could make the squeeze film damper 60 less effective.

Figure 4:
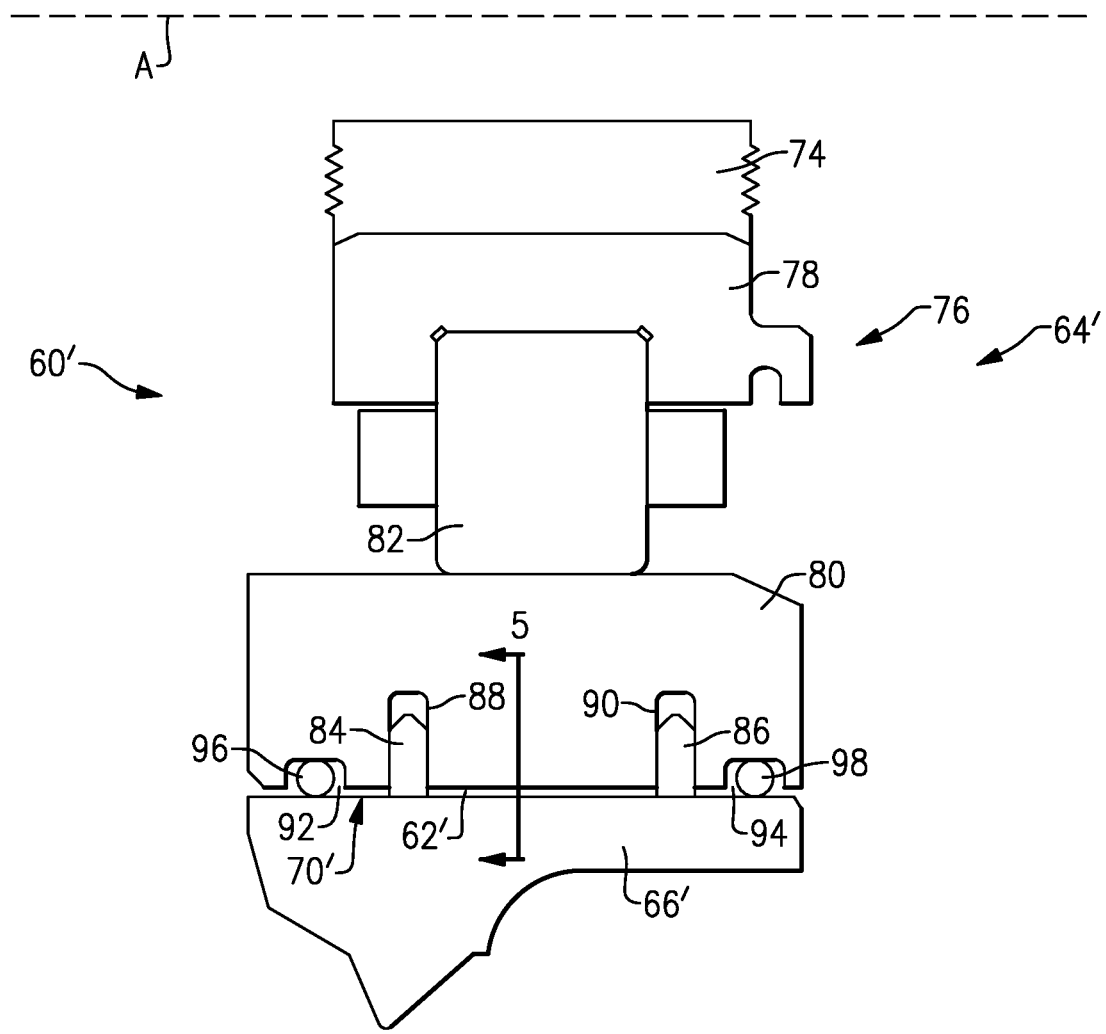
FIG. 4 is a partial cross-sectional view of a portion of the engine including another example squeeze film damper.

FIG. 4 is a partial cross-sectional view of a portion of the engine 20 and illustrates another example squeeze film damper 60' in more detail. It should be understood that the elements shown in partial cross-sectional views in this disclosure generally extend circumferentially about the entire engine central longitudinal axis A.

The squeeze film damper 60' includes many of the same components as the squeeze film damper 60, namely a cavity 62' radially between a rotating assembly 64' and a static housing 66'. In the example of FIG. 4, the rotating assembly 64' includes a shaft 74, which may be the low speed spool 30 or the high speed spool 34 or a spool associated with the fan section 22, and a bearing 76 radially inside the static housing 66' and radially outside the shaft 74. The bearing 76 includes an inner race 78 mounted to the shaft 74 either directly or indirectly. In this regard, shaft 74 in FIG. 4 may be representative of a component configured to directly couple to the low speed or high speed spool, in some examples. The inner race 78 is configured to rotate with the shaft 74, in this example. The bearing 76 further includes an outer race 80, and a plurality of rolling elements 82 between the inner and outer races 78, 80.

In this example, the static housing 66' provides a radially outer boundary of the cavity 62' and the outer race 80 provides a radially inner boundary of the cavity 62'. The cavity 62' is axially bound by first and second cavity seals 84, 86, in this example. The first and second cavity seals 84, 86 are axially spaced-apart from one another along the engine central longitudinal axis A. The first and second cavity seals 84, 86 are received in a respective channel 88, 90 in the outer race 80 and extend radially outward toward, and directly contact, the static housing 66'. The first and second cavity seals 84, 86 extend circumferentially about the entire engine central longitudinal axis A.

In FIG. 4, the reservoir 70' is axially spaced-apart from the cavity 62'. Further, the reservoir 70' includes a first portion 92 on a first axial side of the cavity 62' and a second portion 94 on a second axial side of the cavity 62' opposite the first axial side. The first and second axial sides are fore and aft sides, respectively, in this example. The first portion 92 is between a first reservoir seal 96 and the first cavity seal 84, and the second portion 94 is between a second reservoir seal 98 and the second cavity seal 86. The reservoir and cavity seals may be piston rings or elastomeric seals, as examples.

While first and second portions 92, 94 are illustrated in FIG. 4, in some example arrangements there is only one of the first and second portions 92, 94. In other words, in some examples, the reservoir 70' is either axially forward or axially aft of the cavity 62', but not both, as in FIG. 4. Further, the reservoir 70' may extend about the entire circumference of the engine central longitudinal axis A. In other examples, the reservoir 70' is only arranged adjacent the bottom-most location of the cavity 62'. Additionally, while the first and second portions 92, 94 are substantially equally sized in FIG. 4, the first and second portions 92, 94 could be different sizes.

Figure 3:
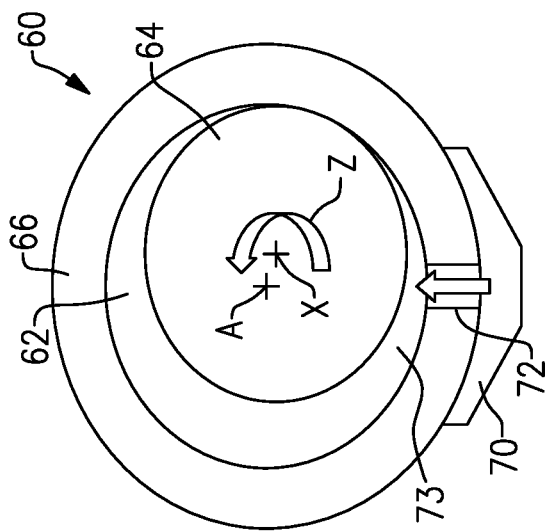
FIG. 3 is a view similar to FIG. 2.
Figure 5:
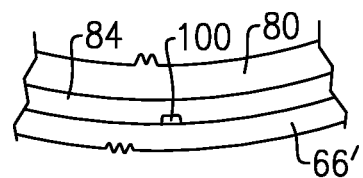
FIG. 5 is a cross-sectional view taken along line 5-5 from FIG. 4.

The first and second cavity seals 84, 86 each include at least one opening functioning substantially the same as the orifice 72 in FIG. 3, namely by permitting lubricant to passively flow between the respective first and second portions 92, 94 of the reservoir 70' and the cavity 62'. An example opening 100 in the first cavity seal 84 is illustrated in FIG. 5. The opening 100 is provided by a notch in a radially outer surface of the first cavity seal 84. The opening 100 extends axially through the entire first cavity seal 84 to provide a path between the cavity 62' and the reservoir 70'. The opening 100 is arranged at a bottom-most location of the first cavity seal 84 in this example. The opening 100 could be arranged at different locations and does not need to be provided by a notch in all examples. The opening 100, could be provided by a gap between ends of a seal, for example. The second cavity seal 86 can include an opening similar to the opening 100. The first and second cavity seals 84, 86 may include a plurality of openings fluidly coupling the cavity 62' and the reservoir 70'.

Figure 6:
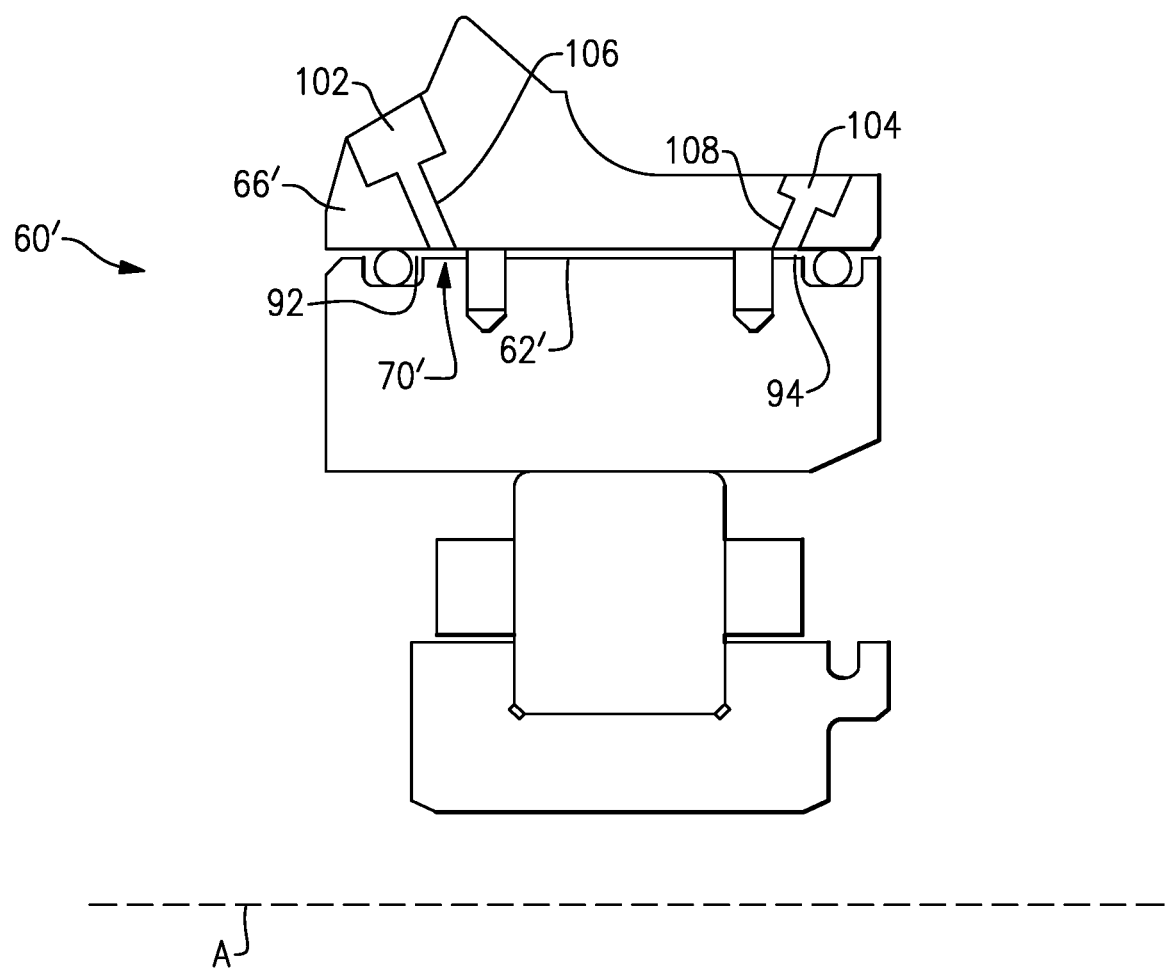
FIG. 6 is another partial cross-sectional view of the portion of the engine from FIG. 4 and illustrates an example port.
Figure 7:
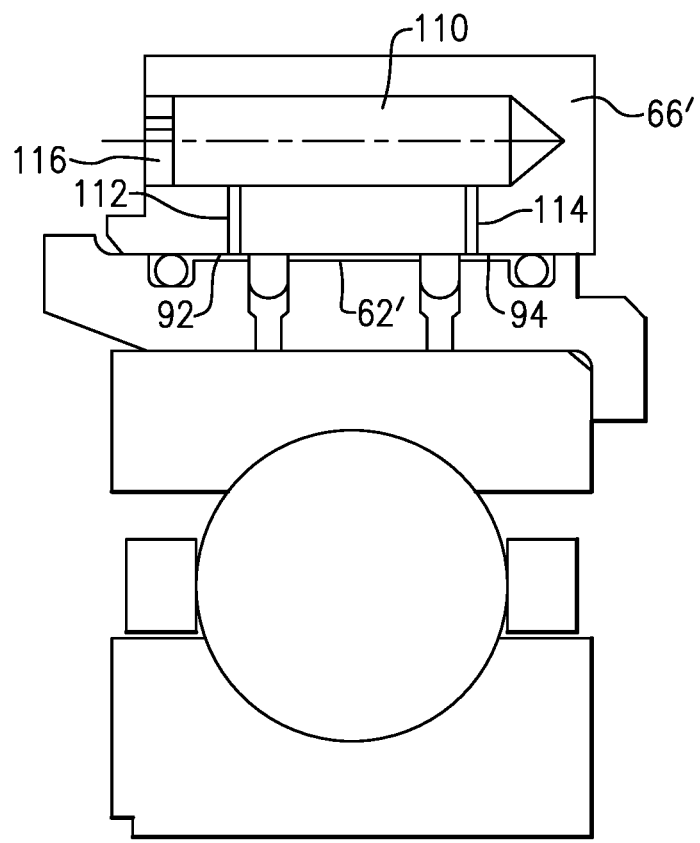
FIG. 7 is a view similar to FIG. 6 and illustrates another example port.

FIGS. 6 and 7 illustrate example ports fluidly coupled to the cavity 62'. The ports are fluidly coupled to the top-most location of the reservoir 70', namely the first and second portions 92, 94. In FIG. 6, the static housing 66' includes first and second oil pools 102, 104 formed in a top-most surface of the static housing 66' and are open facing a radially outward direction. The first and second oil pools 102, 104, are fluidly coupled to respective first and second portions 92, 94 of the reservoir 70' by respective passages 106, 108. As the cavity 62' is filled with lubricant, excess lubricant fills the first and second portions 92, 94 and may flow through the passages 106, 108 to at least partially fill the first and second oil pools 102, 104. As the oil pools 102, 104 overflow, lubricant enters a bearing compartment. This configuration ensures air is substantially expunged from the lubricant within the cavity 62'.

An alternate arrangement is shown in FIG. 7. In FIG. 7, a single oil pool 110 is formed in the static housing 66'. The oil pool 110 is open facing an axial direction. The oil pool 110 is fluidly coupled to respective first and second portions 92, 94 of the reservoir 70' by respective passages 112, 114.

The passages 112, 114 are radially-extending. The passages 112, 114 could be inclined relative to the radial direction, however, in a manner similar to the passages 106, 108 in FIG. 6. The oil pool 110 is closed at an axial end by a drain cap 116, which includes at least one hole, and which is threaded or welded in, as examples. The oil pool 110 functions substantially similar to the oil pools 102, 104, namely by ensuring air is substantially expunged from the cavity 62' during filling.

Figure 8:
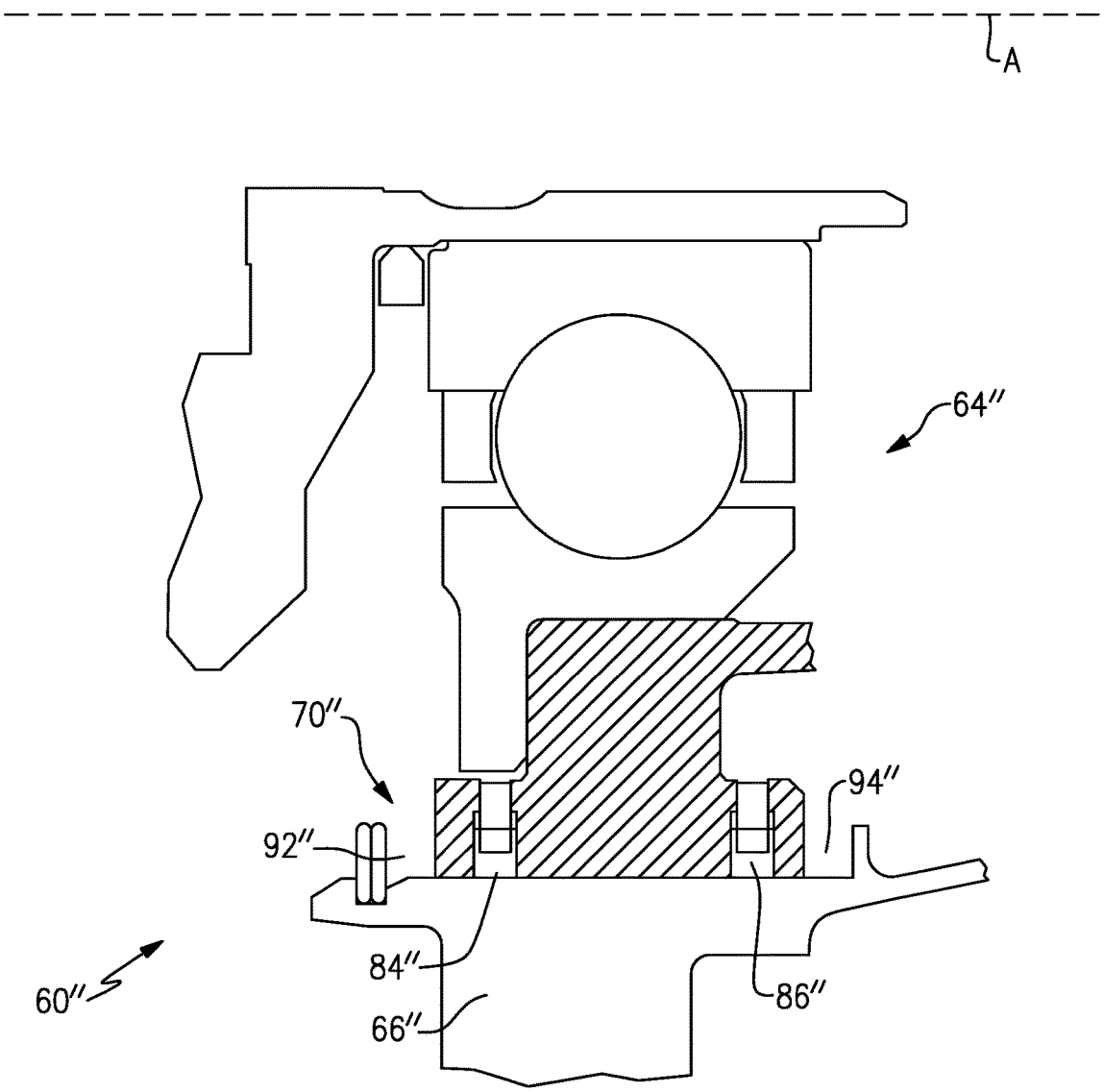
FIG. 8 is a partial cross-sectional view of a portion of the engine including still another example squeeze film damper.

FIG. 8 is a partial cross-sectional view of a portion of the engine 20 and illustrates another example squeeze film damper 60" in more detail. In the example of FIG. 8, there are no reservoir seals, such as the first and second reservoir seals 96, 98, axially outside the first and second cavity seals 84", 86". Rather, in FIG. 8, the reservoir 70" includes first and second portions 92", 94" which are essentially collection areas or basins adjacent a bottom-most location of the rotating assembly 64". The first and second portions 92", 94" are bound at a radially inner location by the static housing 66". Lubricant collects and tends to remain in the first and second portions 92", 94" by virtue of their position at the bottom-most location of the rotating assembly 64".

Figure 9:
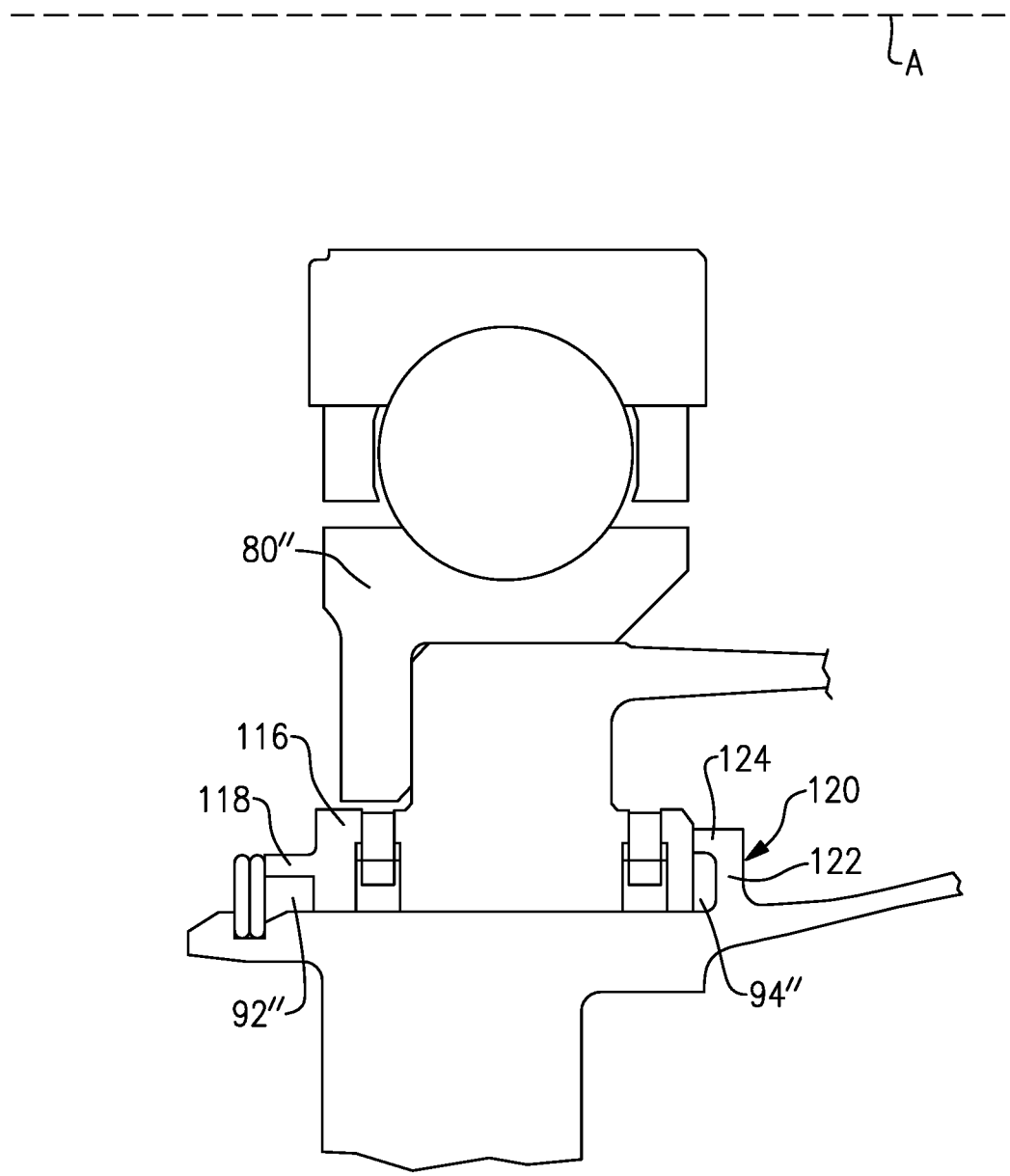
FIG. 9 is a view similar to FIG. 8 with projections covering portions of the reservoir.

In some situations, additional protection for the lubricant in the first and second portions 92", 94" is desired. Specifically, in order to retain lubricant in the first and second portions 92" and 94" by resisting the effects of windage, for example, the static housing 66" and/or a structure 116 adjacent the outer race 80" may include projections such as tabs or flanges configured to radially cover the first and second portions 92" and 94" on an opposite side of the static housing 66", as shown in FIG. 9. The structure 116 could be integral with the outer race 80". In the example of FIG. 9, the structure 116 includes a projection 118 projecting from the structure 116 and abutting another structure projecting radially outwardly from the static housing to provide a radially inner boundary of the first portion 92" and the static housing includes a projection 120 providing a radially inner boundary of the second portion 94". The projection 120, in particular, includes a radially-extending component 122 providing an axially aft boundary of the second portion 94" and an axially-extending component 124 providing the radially inner boundary.

Figure 10:
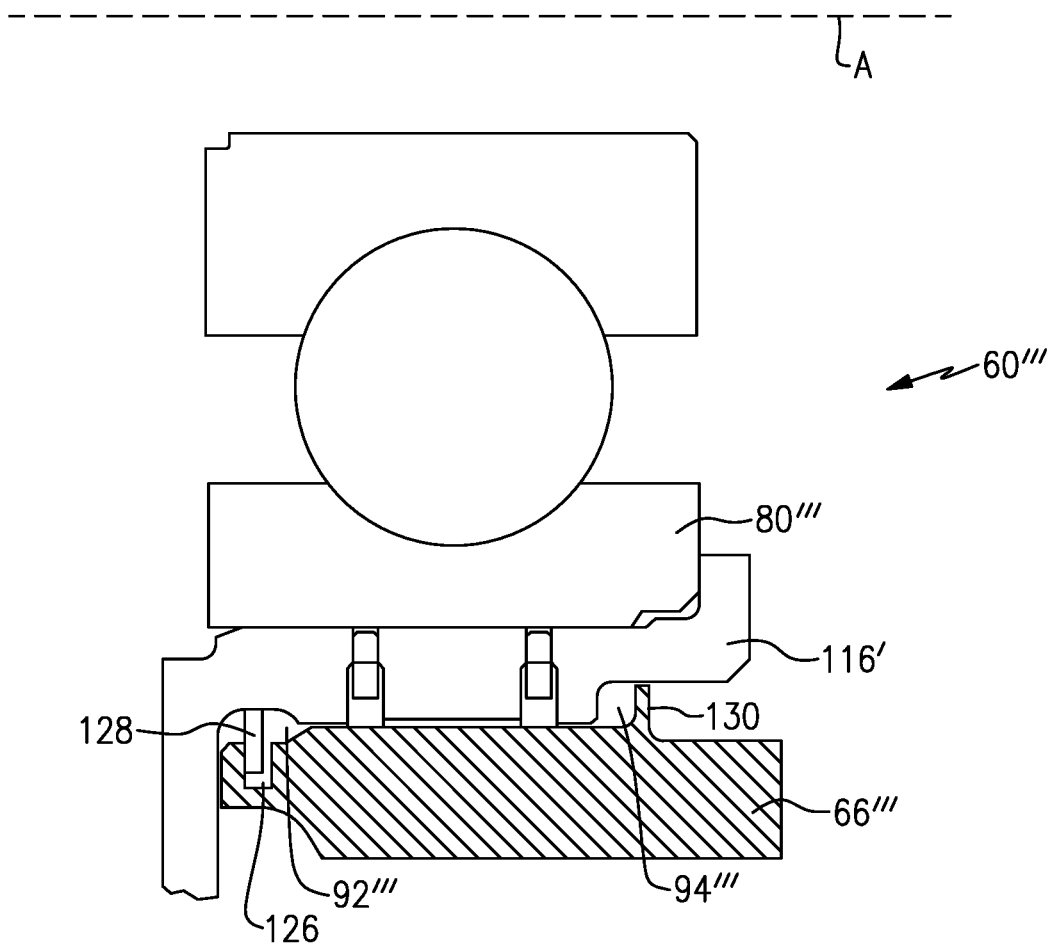
FIG. 10 is a partial cross-sectional view of a portion of the engine including yet another example squeeze film damper.
Figure 11:
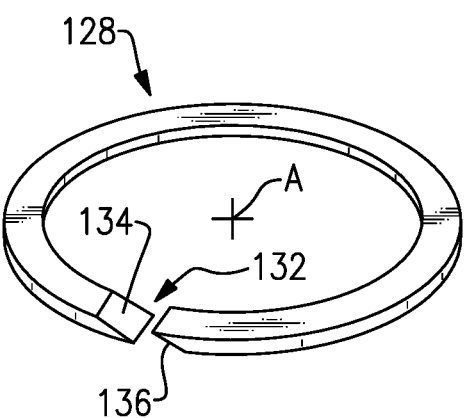
FIG. 11 is a perspective view of an example ring.

Yet another example arrangement is illustrated in FIGS. 10 and 11. With reference to FIG. 10, which is a partial cross-sectional view of a portion of the engine 20 and illustrates another example squeeze film damper 60''' in more detail, the static housing 66''' includes a groove 126 in a radially inner face thereof receiving a ring 128 to provide an axially fore boundary of the first portion 92'''. The ring 128 projects radially outward from the groove 126 and contacts the structure 116', which is directly connected to the outer race 80'''. The second portion 94''' is axially bound by a radial projection 130 projecting radially from, and formed integrally with, the static housing 66''' and contacting the structure 116'.

With reference to FIG. 11, the ring 128 is a split ring, in this example. In particular, the ring 128 includes a groove 132 defined between a first end 134 of the ring 128 and a second end 136 of the ring 128. The first and second ends 134, 136 are spaced circumferentially apart from one another. The first and second ends 134, 136 are defined by faces which are parallel to one another and which extend in directions non-parallel with the engine central longitudinal axis A. The groove 132 increases the ease of installing the ring 128 by permitting expansion of the ring 128 during installation. The ring 128 also retracts after installation to provide a boundary of the first portion 92'''.

Note that throughout this disclosure like elements have been labeled with like reference numerals. When substantially similar structures appear in different embodiments, a trailing apostrophe has been added to the corresponding reference numerals. Further, the various embodiments discussed above are substantially similar unless otherwise described above as being different.

It should be understood that except where otherwise noted, terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a shaft configured to rotate during operation of the gas turbine engine; and
   a squeeze film damper radially outside the shaft, the squeeze film damper including a cavity including a film of lubricant axially between first and second cavity seals, and further including a reservoir fluidly coupled to the cavity,
   wherein the reservoir is passively fluidly coupled to the cavity such that lubricant is free to flow in and out of the reservoir during operation of the gas turbine engine,
   wherein at least one of the first and second cavity seals includes an opening fluidly coupling the cavity to the reservoir and permitting lubricant to flow in and out of the reservoir through the opening.

2. The gas turbine engine as recited in claim 1, wherein the opening is adjacent a bottom-most location of the cavity.

3. The gas turbine engine as recited in claim 1, wherein the reservoir is axially spaced-apart from the cavity.

4. The gas turbine engine as recited in claim 1, wherein the first and second cavity seals each include an opening fluidly coupling the cavity to the reservoir.

5. The gas turbine engine as recited in claim 4, wherein the reservoir includes a first portion on a first axial side of the cavity and a second portion on a second axial side of the cavity opposite the first axial side.

6. The gas turbine engine as recited in claim 5, wherein:
   the first portion is bound at least in part by the first cavity seal and either a first reservoir seal, a ring, or a projection, and
   the second portion is bound at least in part by the second cavity seal and either a second reservoir seal or a projection.

7. The gas turbine engine as recited in claim 1, further comprising:
a housing; and
a bearing radially inside the housing and radially outside the shaft, the bearing including an inner race mounted to the shaft, an outer race, and a plurality of rolling elements between the inner and outer races.

8. The gas turbine engine as recited in claim 7, wherein the housing provides a radially outer boundary of the cavity and the outer race provides a radially inner boundary of the cavity.

9. The gas turbine engine as recited in claim 1, further comprising a source of lubricant fluidly coupled to the cavity.

10. The gas turbine engine as recited in claim 9, wherein the lubricant is oil or an air-oil mixture.

11. The gas turbine engine as recited in claim 1, wherein a port is fluidly coupled to a top-most location of the reservoir.

12. The gas turbine engine as recited in claim 11, wherein the port includes an oil pool.

13. The gas turbine engine as recited in claim 1, wherein the shaft is one of a low speed spool and a high speed spool.

14. The gas turbine engine as recited in claim 1, wherein the squeeze film damper is one of a plurality of squeeze film dampers arranged along the shaft.

15. A method, comprising:
permitting lubricant to passively flow between a cavity of a squeeze film damper and a reservoir during operation of a gas turbine engine such that the lubricant is free to flow in and out of the reservoir during operation of the gas turbine engine through an opening in a seal between the reservoir and the cavity.

16. The method as recited in claim 15, wherein:
the cavity is radially between a rotating assembly and a static housing, and
the rotating assembly rotates about an axis spaced-apart from a central longitudinal axis of the gas turbine engine during operation of the gas turbine engine.

17. The method as recited in claim 16, wherein the rotating assembly creates a leading high pressure wave which causes lubricant to flow through the opening from the cavity into the reservoir, and a trailing low pressure wake which causes lubricant to flow through the opening from the reservoir into the cavity.

18. The gas turbine engine as recited in claim 1, wherein the squeeze film damper is configured such that:
when the shaft creates a leading high pressure wave, lubricant flows through the opening from the cavity into the reservoir, and
when the shaft creates a trailing low pressure wake, lubricant flows through the opening from the reservoir into the cavity.

19. The gas turbine engine as recited in claim 5, wherein the squeeze film damper is configured such that:
when the shaft creates a leading high pressure wave, some lubricant flows from the cavity into the first portion of the reservoir through the opening in the first cavity seal, and some lubricant flows from the cavity into the second portion of the reservoir through the opening in the second cavity seal, and
when the shaft creates a trailing low pressure wake, some lubricant flows from the first portion of the reservoir into the cavity through the opening in the first cavity seal, and some lubricant flows from the second portion of the reservoir into the cavity through the opening in the second cavity seal.

* * * * *